United States Patent [19]
Civanlar

[11] Patent Number: 6,005,935
[45] Date of Patent: *Dec. 21, 1999

[54] METHOD AND SYSTEM OF USING PERSONAL INFORMATION AS A KEY WHEN DISTRIBUTING INFORMATION

[75] Inventor: Mehmet Reha Civanlar, Middletown, N.J.

[73] Assignee: AT&T Corp., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/752,119

[22] Filed: Nov. 20, 1996

[51] Int. Cl.$^6$ .............................. H04L 9/00; H04K 1/00; G06F 7/04; G07D 7/00
[52] U.S. Cl. ............................ 380/4; 380/23; 340/825.3; 340/825.31; 340/825.34; 705/26
[58] Field of Search ...................... 380/4, 23; 340/825.3, 340/31, 34; 705/26

[56] References Cited

U.S. PATENT DOCUMENTS

| | | | |
|---|---|---|---|
| 4,644,493 | 2/1987 | Cheanra et al. | 364/900 |
| 4,658,093 | 4/1987 | Hellman | 380/25 |
| 4,683,553 | 7/1987 | Mollier | 380/4 |
| 4,683,968 | 8/1987 | Appelbaum et al. | 380/4 |
| 4,685,055 | 8/1987 | Thomas | 364/200 |
| 4,688,169 | 8/1987 | Joshi | 364/200 |
| 4,796,220 | 1/1989 | Wolfe | 364/900 |
| 4,866,769 | 9/1989 | Karp | 380/4 |
| 4,999,806 | 3/1991 | Chernow et al. | 364/900 |
| 5,103,476 | 4/1992 | Waite et al. | 380/4 |
| 5,179,591 | 1/1993 | Hardy et al. | 380/21 |
| 5,182,770 | 1/1993 | Medveczky et al. | 380/4 |
| 5,199,066 | 3/1993 | Logan | 380/4 |
| 5,210,795 | 5/1993 | Lipner et al. | 380/23 |
| 5,259,029 | 11/1993 | Duncan, Jr. | 380/4 |
| 5,311,594 | 5/1994 | Penzias | 380/23 |
| 5,337,357 | 8/1994 | Chou et al. | 380/4 |
| 5,379,433 | 1/1995 | Yamagishi | 395/725 |
| 5,420,926 | 5/1995 | Low et al. | 380/24 |
| 5,440,631 | 8/1995 | Akiyama et al. | 380/4 |
| 5,490,216 | 2/1996 | Richardson, III | 380/4 |
| 5,555,304 | 9/1996 | Hasebe et al. | 380/4 |
| 5,563,947 | 10/1996 | Kikinis | 380/4 |
| 5,586,186 | 12/1996 | Yuval et al. | 380/30 |
| 5,625,690 | 4/1997 | Michel et al. | 380/4 |
| 5,636,277 | 6/1997 | Nagahama | 380/4 |
| 5,652,793 | 7/1997 | Priem | 380/4 |

*Primary Examiner*—Pinchus M. Laufer
*Assistant Examiner*—Hrayb A. Sayadian
*Attorney, Agent, or Firm*—Morgan & Finnegan, L.L.P.

[57] ABSTRACT

"A method of using personal information as a decryption key for encrypted software. When software is sold, a purchaser provides a seller with several pieces of personal information that will be used as part of a decryption key. The personal information is tied to the purchaser or a user of the software. For example, the personal information can include, but is not limited to, the purchaser's social security number, telephone number, expiration date of the credit card, address, mother's maiden name, children's names, bank account information. This personal information is embedded in the purchased or licensed software. The material is then conveyed to the purchaser. To activate the software the purchaser must enter the key that includes the personal information. The software compares the key that the purchaser enters with the personal information embedded in the software. The software will only be installed if the key and the personal information match."

29 Claims, 2 Drawing Sheets

METHOD AND SYSTEM OF USING PERSONAL INFORMATION AS A KEY WHEN DISTRIBUTING INFORMATION

BACKGROUND OF THE INVENTION

1. Field of the Invention

The present invention is directed to a key, and more particularly, to using personal information as a key when distributing information over a communications network.

2. Description of the Related Art

With the advent of the world wide web (WWW) and the Internet, it has become more and more difficult to distribute materials over the WWW without the fear of illegal replication. For example, books or CD quality music are available on the WWW through a direct path between authors or musicians and the end users. However, it is extremely easy for anyone to replicate and distribute this material to an unlimited number of people over the Internet. Because of this, most authors and musicians are not willing to make their works available on the WWW. Therefore, to make electronic information distribution feasible, a mechanism is needed to make replication and distribution difficult for most people.

One way to protect information is to encrypt it. In any encryption mechanism, the object is to make it difficult to disseminate unauthorized information. There are several methods for encryption. Almost all of the encryption methods are based on the use of a "key" for decryption of the encrypted material. A private key is usually one that is difficult to decipher. In many cases, it is a large prime number that would take a high speed computer a long time, up to many years to determine. A key can also be words or phrases that are unrelated or make no sense. These words or phrase are then converted to binary form.

However, with any of the known methods for determining a key, the person holding the key can give it to anyone. That person or persons can disseminate the information to anyone they want. At that point, there is no telling how many people will eventually have access to the key and it does not matter how difficult it is to determine the key since it was readily disclosed to others.

SUMMARY OF THE INVENTION

The present invention provides a method and system which uses personal information as a key when distributing information over a communications network.

In the present invention software or other media is purchased over a variety of media including communications networks, U.S. mail, through a store, etc. A personal information key is sent along with the purchase order and embedded in the purchased software. The software is then downloaded to a computer. A key is then typed in and compared with the key embedded in the software. If the keys match, then the downloaded software can be installed to be used. Anyone wanting to access the material must type in the key. For certain applications the key must be typed each time the material is to be accessed.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

Figure 1:
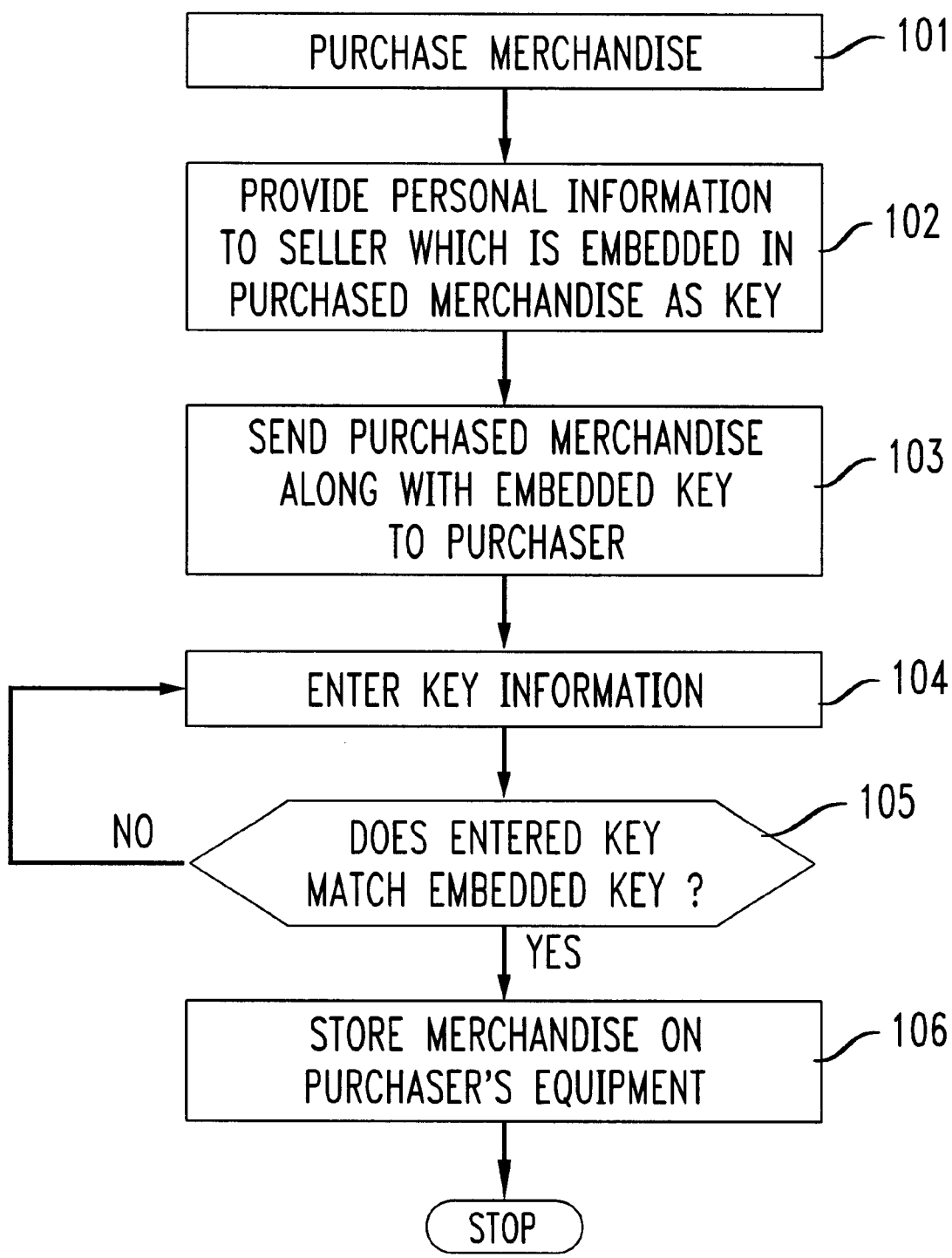
FIG. 1 is a flow chart generally describing the operation of the present invention.

The present invention is directed to a system and method which uses personal information as a key for protecting information sent over a communications network. As shown in the flow chart of FIG. 1, merchandise is purchased in step 101. Personal information is then forwarded along with a purchase order to a seller. The personal information is then embedded in the purchased merchandise by the seller as a key as shown in step 102. Step 103 forwards the purchased merchandise along with the key embedded therein to the buyer. It should be noted that the key may be sent separately or may be sent with additional merchandise particularly if the buyer already has the purchased merchandise or portions of the purchased merchandise in his or her possession.

To access the purchased merchandise, the buyer must enter a key in step 104. The keys are then compared in step 105. If the entered key matches the embedded key, the purchased merchandise is stored or installed on the purchaser's computer in step 106. If the keys do not match, the process returns to step 104. The present invention will now be explained in detail with respect to the system shown in FIG. 2.

Figure 2:
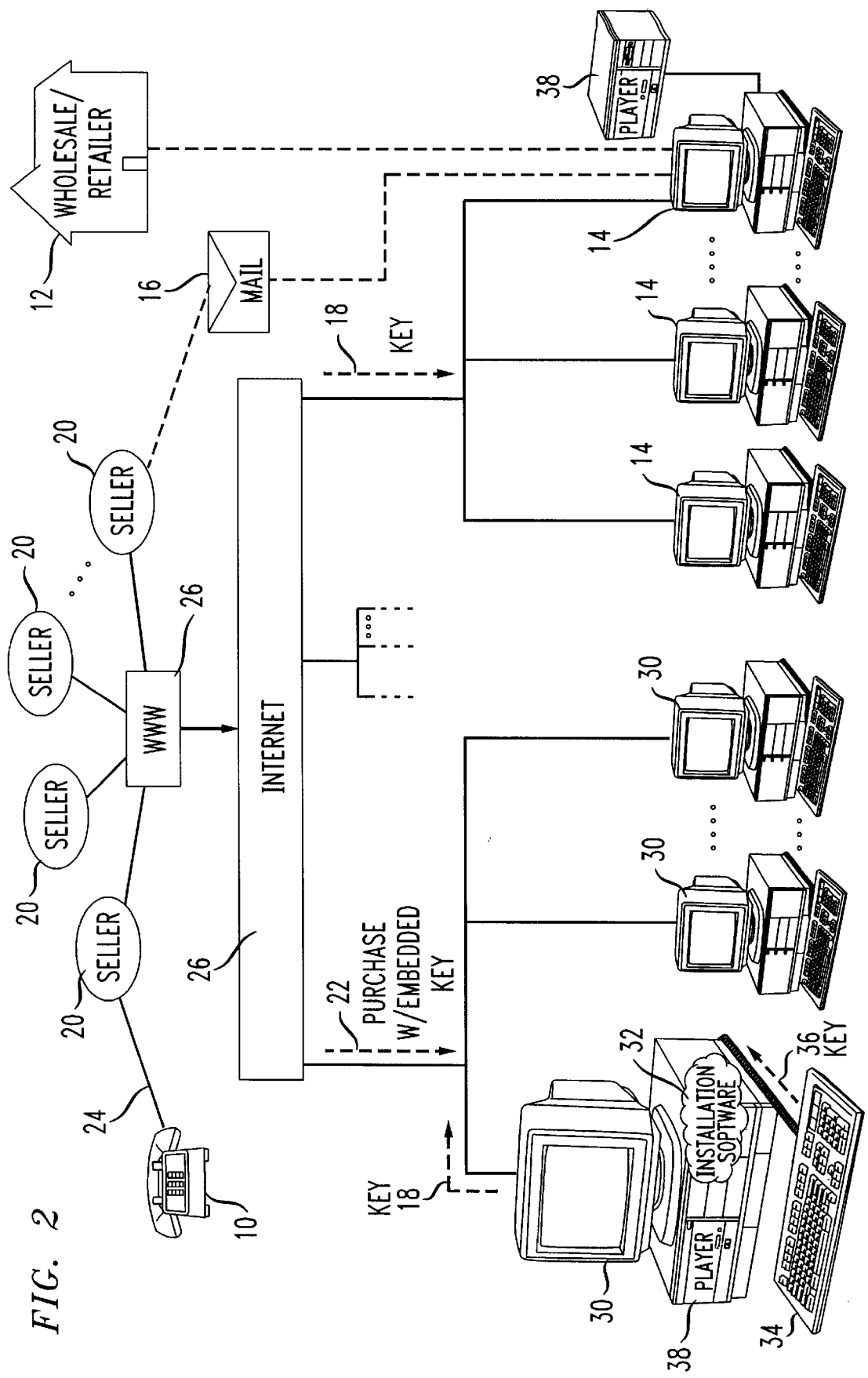
FIG. 2 is a block diagram of a system according to the present invention.

As shown in FIG. 2, digital data such as software, CD's, books, movies, etc., is purchased over a telephone 10, through a store 12, by way of computer 14, through the mails 16 or by other communications devices. A key 18 is then designed based on information obtained from the purchaser. The key 18 can include alpha, numeric or alphanumeric information. Particularly, the key 18 includes personal information.

If software is purchased from a store 12, for example, then the purchaser contacts the seller 20 of the software by various means such as telephone 10, computer 14, mail 16, etc. The purchaser then provides information to the seller 20 necessary to design the key 18. The seller 20 then forwards additional software 22, along with the key 18, either via a floppy disk or electronically, to the purchaser. Additionally, the seller 20 can forward just the key 18 to the purchaser or, if the software is purchased electronically, the key 18 is forwarded along with the purchased software. Upon receipt of the key 18, the purchaser can download and store the already purchased software. That is, it is embedded in the purchased software. The key 18 is used for protection of the digital data from access by others when it is downloaded to the purchaser.

The personal information that makes up the key 18 can include such information as a credit card number, name, address, telephone number, expiration date of the card, etc., and any combination thereof. Particularly, it is advantageous that at least three pieces of personal information be used as the key. This is because it might be easy for someone to intercept a credit card number and use it but it is not easy to know the credit card holder's mother's name, maiden name, spouse's name, children's names, birthdate, social security number, etc. Credit card information is only used as an example. Bank account information can also be used along with additional personal information, or any other type of information that is personal to the buyer that is not easily known by others.

As noted above, if the merchandise is electronically purchased, the key 18, including personal information, is forwarded to the seller 20 along with the purchase order for the merchandise. If the merchandise is purchased at a store, for example, the purchaser contacts the seller 20, via any known means of communication, to provide the seller with personal information so that the key 18 can be designed and embedded in the merchandise and delivered to the purchaser. The personal information used to design the key 18 can be forwarded to the seller by numerous means including, but not limited to, telephone lines 24, over the WWW 26 or the Internet 28, or in a floppy disk by mail 16, as examples.

The key 18 is then embedded in the software by the seller 20 in a conventional manner. It should be noted that the personal information used to design the key 18 can be encrypted either by the purchaser before being sent to the seller 20 or by the seller 20 when it is embedded in the software. The merchandise, such as software, including the key 18 is then sent to the purchaser. The merchandise can be sent by way of CD, floppy disk, modem, mail, etc. The software is then downloaded to the purchaser's computer 30. The purchaser's computer 30 can be, for example, a multimedia computer, but is not limited thereto.

Installation software 32 in the purchaser's computer 30 receives the purchased merchandise. For example, if the purchased merchandise is a music CD the purchaser needs to access the music CD. A prompt is given, by software internal to the computer 30, to enter a key 36. This is done by typing in the key 36, e.g., the personal information embedded in the merchandise, using, for example, a keyboard 34. The installation software 32 in the purchaser's computer 30 then compares the key 18 embedded in the merchandise with the typed key 36. The comparison is performed either by a comparator or with comparison software, both internal to the purchaser's computer 30 and not shown. If the two keys match, the data can then be stored (installed) in the purchaser's computer 30. If the keys do not match, then the merchandise is not installed.

If the key 18 was encrypted, it must be decrypted by a decryption device or software in the purchaser's computer 30. The key 18 is decrypted unbeknownst to the user. That is, decryption automatically occurs.

Once it is determined that the keys match, and if the merchandise purchased is, for example, a music CD, the software is then sent as binary information to a player 38 which is part of the purchaser's computer 30 or is attached to the purchaser's computer 30. Then, if, for example, the merchandise is a music CD, the CD can be played.

The player 38 in the purchaser's computer 30 can be a CD player, a movie player, a picture viewer or a text viewer. The player 38 can also be software in the computer 30 that can play the received software. In this instance, the player 38 requires the key 18 every time it plays the merchandise. That is, every time the purchaser wants to access the merchandise, the key 36 must be entered and compared with the key 18 embedded in the merchandise to access the software.

Thus, because the merchandise such as a music CD, software, etc., cannot be accessed unless a key containing personal information is input this will deter the purchaser from passing on the purchased merchandise because it will require disclosure of the purchaser's personal information. Users will not be willing to reveal their key if it is based on something as personal as their credit card information including their credit card number, expiration date, holder's name, address, telephone number, social security number, maiden name, mother's name, bank account information, etc. Although the personal information is used to purchase the software, it is not readily available to others for their use.

The foregoing is considered as illustrative only of the principles of the invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention and the appended claims and their equivalents.

I claim:

1. A method for using personal information as a key, said method comprising the steps of:
    a) purchasing software in a purchase transaction that includes providing human readable personal information known to the purchaser;
    b) acquiring at a seller said human readable personal information from the purchaser of software;
    said human readable personal information including at least three pieces of personal information selected from among the purchaser's name, address, telephone number, mother's name, maiden name, spouse's name, children's names, birthdate, and social security number;
    designing a key for accessing the purchased software, said key being said human readable personal information acquired from the purchaser, wherein the personal information is independent of a particular electronic medium in which the software will be installed;
    c) embedding the human readable personal information key in the purchased software;
    d) conveying the purchased software to the purchaser through an electronic medium;
    e) asking the purchaser to enter a human readable personal information key, by a prompt from the electronic medium, before allowing the purchaser to access the conveyed software;
    f) entering by the purchaser the human readable personal information key;
    g) comparing the entered key with the key embedded in the software; and
    h) allowing the purchaser to access the conveyed software if the entered and embedded keys match.

2. A method according to claim 1, further comprising the step of:
    i) entering the key every time the software is to be accessed.

3. A method according to claim 1, wherein said step a) comprises purchasing the software over a communications network.

4. A method according to claim 1, wherein said step a) comprises purchasing the software through the U.S. mail.

5. A method according to claim 1, wherein said step a) comprises purchasing the software through a store.

6. A method according to claim 1, wherein in said step b), the personal information is sent over a communications network.

7. A method according to claim 6, wherein the communications network is a telephone communications network.

8. A method according to claim 6, wherein the communications network is a computer network.

9. A method according to claim 1, wherein said step d) includes downloading the software over any type of medium.

10. A method according to claim 9, wherein the medium is a multimedia computer.

11. A method according to claim 1, wherein said step d) comprises downloading the purchased software as binary information to a player attached to a purchaser's computer.

12. A method according to claim 11, wherein said step f) includes entering the key on a keyboard of the purchaser's computer.

13. A method according to claim 12, wherein the player is one of a CD player, movie player, picture viewer, text viewer and software that plays.

14. A method according to claim 12, wherein the software is downloaded as player information running on the purchaser's computer.

15. A method according to claim 14, wherein the player is one of a CD player, movie player, picture viewer, text viewer and software that plays.

16. A method according to claim 15, wherein the player requires a key every time it plays the software.

17. A system using personal information as a key, said system comprising:

means for purchasing software in a purchase transaction that includes providing human readable personal information know to a purchaser;

a device for conveying, by the purchaser to a seller of said software, at least three pieces of said personal information in said human readable form;

said personal information including at least three pieces of personal information selected from among the purchaser's name, address, telephone number, mother's name, maiden name, spouse's name, children's names, birthdate, and social security number;

means for designing a key, said key for accessing the purchased software, said key being said at least three pieces of personal information in human readable form; and means for embedding said key in said software;

downloading means for downloading said purchased software, with said key being embedded therein, to a computer of the purchaser;

a device for entering information, connected to the computer of the purchaser, through which the key is entered to the computer; and a comparator for comparing said entered key with said being at least three pieces of personal information in human readable form embedded in said purchased software, whereby the purchaser is allowed to access said purchased software only if there is a match between the entered and embedded keys;

wherein said at least three pieces of personal information forming the keys are independent of the computer.

18. A system according to claim 17, wherein every time said software is to be accessed, said key must be input, by said device for entering, and compared, by said comparator, with said at least three pieces of personal information embedded in said purchased software.

19. A system according to claim 17, wherein said device for conveying said at least three pieces of personal information comprises a keyboard.

20. A system according to claim 17, wherein said computer comprises a multimedia computer.

21. A system according to claim 17, wherein said means for purchasing software is a computer connected to the Internet.

22. A system according to claim 17, wherein said means for purchasing software is a telephone.

23. A system according to claim 17, wherein said means for purchasing software is in a store.

24. A system according to claim 17, wherein said at least three pieces of personal information comprise alpha, numeric or alphanumeric information.

25. A system according to claim 17, further comprising encryption means for encrypting said at least three pieces of personal information.

26. A system according to claim 25, further comprising decryption means for decrypting said encrypted at least three pieces of personal information.

27. A system according to claim 26, wherein said decryption means is a player in said computer.

28. A system according to claim 27, wherein said player is one of a CD player, movie player, picture viewer, and text viewer.

29. A system according to claim 27, wherein said player is software.

\* \* \* \* \*